US010774960B2

United States Patent
Nguyen et al.

(10) Patent No.: US 10,774,960 B2
(45) Date of Patent: Sep. 15, 2020

(54) TONGUED AND GROOVED FLUID TRANSPORT SUBCOMPONENTS AND ASSEMBLIES

(71) Applicant: SAINT-GOBAIN PERFORMANCE PLASTICS CORPORATION, Solon, OH (US)

(72) Inventors: Hy B. Nguyen, Upland, CA (US); Van Trong Tran, Irvine, CA (US)

(73) Assignee: SAINT GOBAIN PERFORMANCE PLASTICS CORPORATION, Solon, OH (US)

( * ) Notice: Subject to any disclaimer, the term of this patent is extended or adjusted under 35 U.S.C. 154(b) by 114 days.

(21) Appl. No.: 15/497,480

(22) Filed: Apr. 26, 2017

(65) Prior Publication Data

US 2017/0314712 A1    Nov. 2, 2017

Related U.S. Application Data

(60) Provisional application No. 62/329,901, filed on Apr. 29, 2016.

(51) Int. Cl.
*F16L 19/025* (2006.01)
*F16L 19/02* (2006.01)
(Continued)

(52) U.S. Cl.
CPC ........... *F16L 19/025* (2013.01); *F16L 19/005* (2013.01); *F16L 19/0225* (2013.01); *F16L 47/04* (2013.01)

(58) Field of Classification Search
CPC ......... F16L 33/24; F16L 19/00; F16L 19/025; F16L 19/005; F16L 19/0225; F16L 25/023; F16L 47/04; F16L 23/12; F16L 27/082
(Continued)

(56) References Cited

U.S. PATENT DOCUMENTS 1,267,313 A    5/1918 Cook
1,302,314 A *  4/1919 Cornell ............... F16L 27/0816
                                                    285/279

(Continued)

FOREIGN PATENT DOCUMENTS

CN    103277602 A    9/2013
CN    104075049 A    10/2014
(Continued)

OTHER PUBLICATIONS

International Search Report for PCT/US2017/029564, dated Aug. 11, 2017, 1 page.

*Primary Examiner* — Zachary T Dragicevich
*Assistant Examiner* — William S. Choi
(74) *Attorney, Agent, or Firm* — Abel Schillinger, LLP; Chi Suk Kim

(57) ABSTRACT

A fluid transport coupling subcomponent can include a body having a first axial end with a first axial face, a second axial end, and a hollow conduit extending between the first and second axial ends, a tongue extending longitudinally from the first axial face; and a groove recessed into the first axial face. The tongue can extend a distance, $D_{T1}$, from the first axial face and the groove can extend a distance, $D_{G1}$, into the body from the planar face, where $D_{G1}$ and $D_{T1}$ can be different.

18 Claims, 6 Drawing Sheets

(51) Int. Cl.
*F16L 19/00* (2006.01)
*F16L 47/04* (2006.01)

(58) Field of Classification Search
USPC ... 285/14, 331, 336, 351, 354, 432, 386, 92, 285/148.8, 353, 355, 357, 390, 391, 392, 285/393
See application file for complete search history.

(56) References Cited

U.S. PATENT DOCUMENTS

| | | | | |
|---|---|---|---|---|
| 1,715,854 A * | 6/1929 | McKenzie-Martyn | ..................... | F16L 23/20 |
| | | | | 277/614 |
| 1,884,551 A * | 10/1932 | Boynton | ..................... | 285/336 |
| 2,238,462 A * | 4/1941 | Crepeau | ............. | F16L 19/0225 |
| | | | | 285/331 |
| 2,284,216 A | 5/1942 | Kunkel | | |
| 2,557,140 A * | 6/1951 | Razdowitz | ............. | F16L 27/082 |
| | | | | 285/331 |
| 3,288,494 A * | 11/1966 | Callahan, Jr. | ....... | F16L 19/0218 |
| | | | | 285/14 |
| 3,381,980 A * | 5/1968 | Smith | ..................... | F16L 17/00 |
| | | | | 285/109 |
| 3,485,516 A * | 12/1969 | Hans | ..................... | F16L 23/12 |
| | | | | 285/14 |
| 3,789,753 A * | 2/1974 | Rutherford | ..................... | 101/494 |
| 3,834,743 A * | 9/1974 | Strybel | ................ | F16L 19/10 |
| | | | | 285/249 |
| RE29,376 E * | 8/1977 | Hiszpanski | ......... | F16L 19/0206 |
| | | | | 285/148.9 |
| 4,288,110 A * | 9/1981 | Grenell | ................ | F16L 33/24 |
| | | | | 285/148.13 |
| 5,066,051 A * | 11/1991 | Weigl | ................ | F16L 19/0212 |
| | | | | 285/328 |
| 5,118,141 A * | 6/1992 | Miyashita | ............ | F16J 15/0893 |
| | | | | 285/23 |
| 5,261,442 A * | 11/1993 | Kingsford | ............. | F16K 11/048 |
| | | | | 137/312 |
| 5,350,200 A * | 9/1994 | Peterson | ............. | F16L 19/0225 |
| | | | | 285/330 |
| 5,645,301 A * | 7/1997 | Kingsford | ............ | F16L 19/0218 |
| | | | | 285/14 |
| 5,699,822 A * | 12/1997 | Bodhaine | ................ | F16L 29/00 |
| | | | | 285/24 |
| 5,743,572 A * | 4/1998 | Nishio | .................. | F16L 19/041 |
| | | | | 285/331 |
| 5,829,796 A * | 11/1998 | Robinson | ............ | F16L 19/0212 |
| | | | | 285/288.1 |
| 5,996,636 A * | 12/1999 | Fukano | ................... | F16L 47/04 |
| | | | | 138/109 |
| 5,997,049 A * | 12/1999 | Kingsford | ............. | F16L 15/008 |
| | | | | 285/331 |
| 6,022,053 A * | 2/2000 | Hukuda | .............. | F16L 19/0283 |
| | | | | 285/246 |
| 6,073,969 A * | 6/2000 | Zimmerly | ............... | F16L 23/22 |
| | | | | 277/614 |
| 6,299,216 B1 * | 10/2001 | Thompson | .................... | 285/351 |
| 6,412,832 B1 * | 7/2002 | Donoho | ............. | F16L 19/0231 |
| | | | | 285/110 |
| 6,547,253 B2 | 4/2003 | Izumi et al. | | |
| 6,623,047 B2 * | 9/2003 | Olechnowicz | ........ | F16L 19/005 |
| | | | | 277/611 |
| 7,226,089 B2 * | 6/2007 | Wilkinson, III | ........... | 285/123.1 |
| 7,396,052 B2 * | 7/2008 | Johnson, Jr. | ............ | F16L 23/16 |
| | | | | 285/363 |
| 7,497,482 B2 * | 3/2009 | Sugiyama | ........... | F16L 19/0218 |
| | | | | 285/328 |
| 8,800,965 B2 * | 8/2014 | Stefani | .................. | F16K 1/2265 |
| | | | | 251/305 |
| 9,145,990 B2 * | 9/2015 | Yuhara | ............... | F16L 19/0218 |
| 9,342,077 B2 * | 5/2016 | Nguyen | .................... | G05D 7/03 |
| 9,599,240 B2 * | 3/2017 | Nguyen | ............. | F16K 15/025 |
| 2008/0061551 A1 * | 3/2008 | Simmons | ................ | F16L 19/02 |
| | | | | 285/249 |
| 2008/0296893 A1 * | 12/2008 | Romano | ................ | F16L 19/025 |
| | | | | 285/331 |

FOREIGN PATENT DOCUMENTS

| | | |
|---|---|---|
| JP | S60260793 A | 12/1985 |
| JP | H10318460 A | 12/1998 |
| JP | H11160190 A | 6/1999 |
| JP | H11210960 A | 8/1999 |
| JP | 2002005291 A | 1/2002 |
| JP | 2006064081 A | 3/2006 |
| JP | 2006112901 A | 4/2006 |
| JP | 2006161830 A | 6/2006 |
| JP | 2006161874 A | 6/2006 |
| JP | 4450711 B2 | 4/2010 |
| JP | 2010255854 A | 11/2010 |
| KR | 100951052 B1 | 9/2010 |
| KR | 100981082 B1 | 9/2010 |
| KR | 200470240 Y1 | 12/2013 |
| WO | 2003078884 A1 | 9/2003 |
| WO | 2015135812 A1 | 9/2015 |
| WO | 2017189678 A1 | 11/2017 |

* cited by examiner

TONGUED AND GROOVED FLUID TRANSPORT SUBCOMPONENTS AND ASSEMBLIES

CROSS-REFERENCE TO RELATED APPLICATION

This application claims priority under 35 U.S.C. § 119(e) to U.S. Provisional Application No. 62/329,901, entitled "TONGUED AND GROOVED FLUID TRANSPORT SUBCOMPONENTS AND ASSEMBLIES" by Hy B. NGUYEN et al., filed Apr. 29, 2016, which is assigned to the current assignee hereof and is incorporated herein by reference in its entirety.

FIELD OF THE DISCLOSURE

The present disclosure relates to fluid transport couplings, and more particularly to, fluid transport couplings containing tongue and groove engagements.

RELATED ART

Releasable fluid transport couplings and unions that are used in fluid handling systems have typically been limited in their working pressures and the ability to perform consistently over a long life.

For example, systems such as disclosed in U.S. Pat. No. 5,645,301, entitled "Fluid Transport Coupling" have not been able to meet heightened industry needs in working pressures and longevity. For example, without wishing to be bound by theory, it is believed that over time, the nut in such assemblies tends to back out leading to leaks if the nut is not consistently re-torqued.

The present disclosure illustrates unique tongue and groove couplings that provide a significant and unexpected increase in working pressures and longevity.

BRIEF DESCRIPTION OF THE DRAWINGS

Embodiments are illustrated by way of example and are not limited in the accompanying figures.

Figure 1:
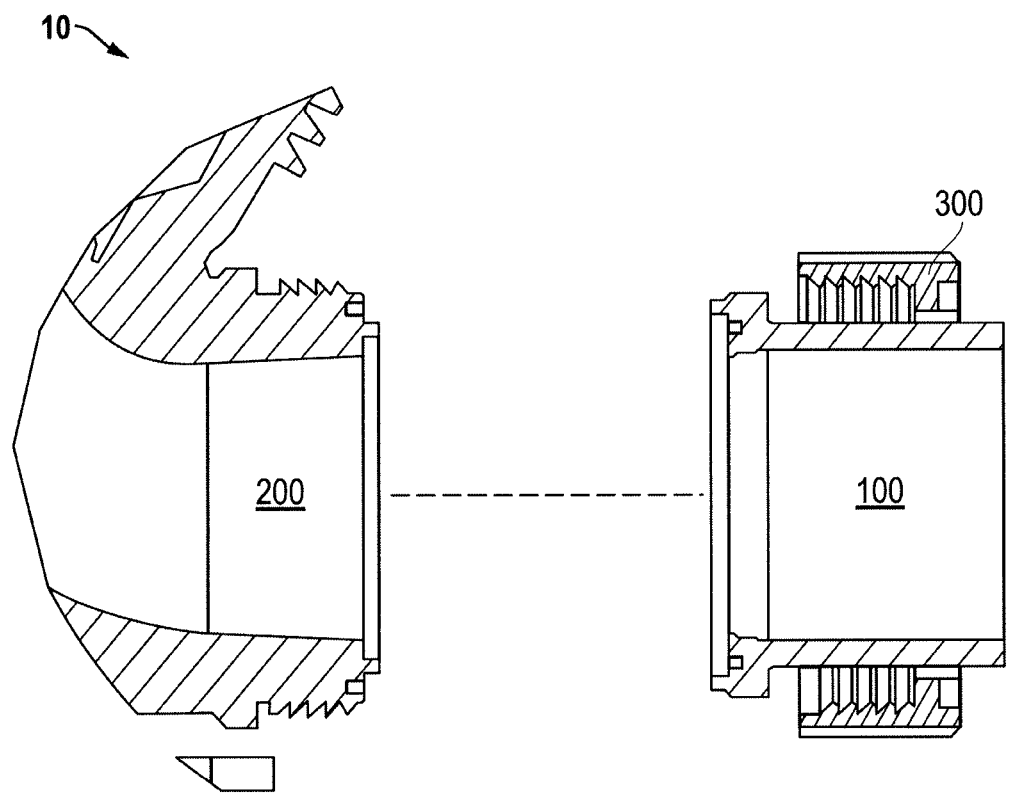
FIG. 1 includes an exploded-view cross-sectional illustration of a fluid transport assembly according to an embodiment described herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the fluid transport arts.

The present disclosure is directed to fluid transport components and assemblies exhibiting improved working pressures and longevity. In certain embodiments, the fluid transport couplings can have a tongue and groove configuration that creates an increased number of sealing surfaces and in different directions within the fluid transport coupling. For example, the tongue and groove configuration can include each of the interfacing components having at least one tongue and at least one groove on the same face. The concepts are better understood in view of the embodiments described below that illustrate and do not limit the scope of the present invention.

Figure 2:
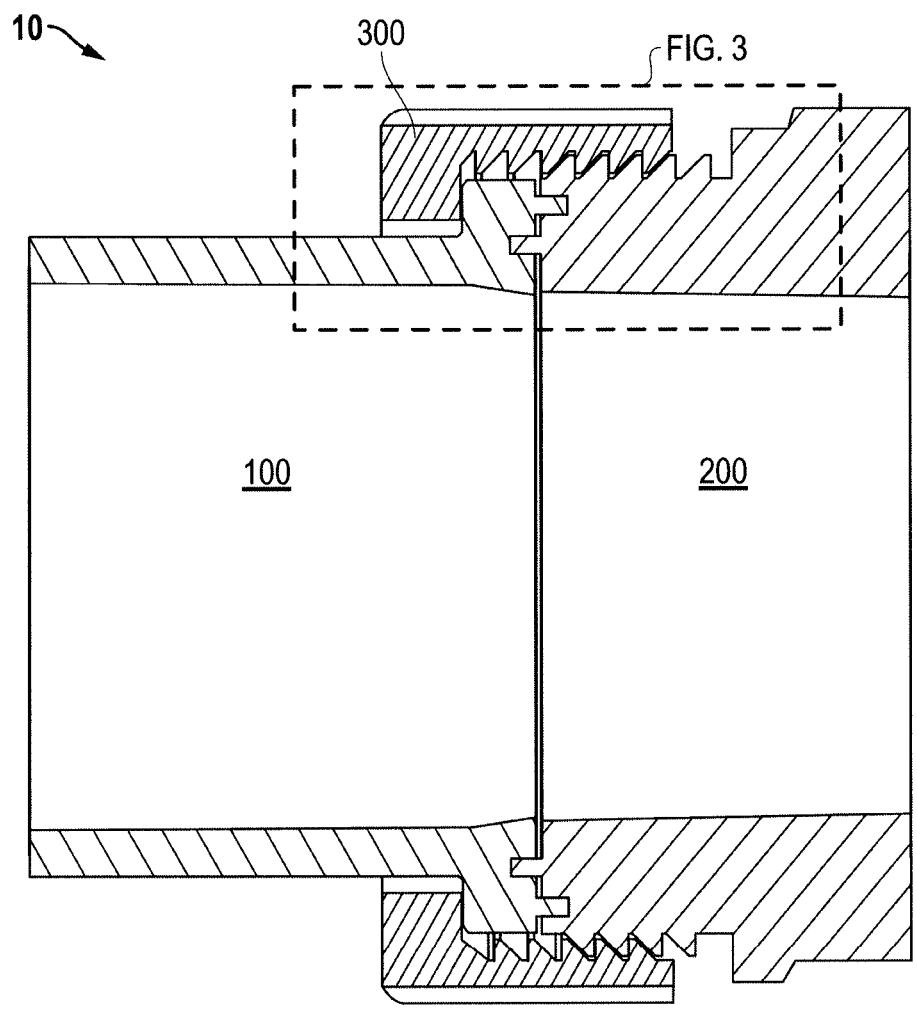
FIG. 2 includes an assembled-view cross-sectional illustration of a fluid transport assembly according to an embodiment described herein.

FIG. 1 includes an illustration of an embodiment of a fluid transport assembly 10 in an exploded view and FIG. 2 includes an illustration of an embodiment of the fluid transport assembly 10 in a reversed, assembled view. The assembly 10 can include a first component 100 engaged with a second component 200 by a threaded nut 300. The first component or the second component can be in the form of a tube, such as a flexible polymer tube. In other embodiments, the first component or the second component can be in the form of a valve, a coupling or any other component to which a fluid-tight connection is desired. For example, in particular embodiments the first component or the second component can comprise a check valve. In particular embodiments, the first component can comprise a flexible polymer tube and the second component can comprise a valve. Further, the first component can comprise a flexible polymer tube and the second component can comprise a flexible polymer tube.

Figure 3:
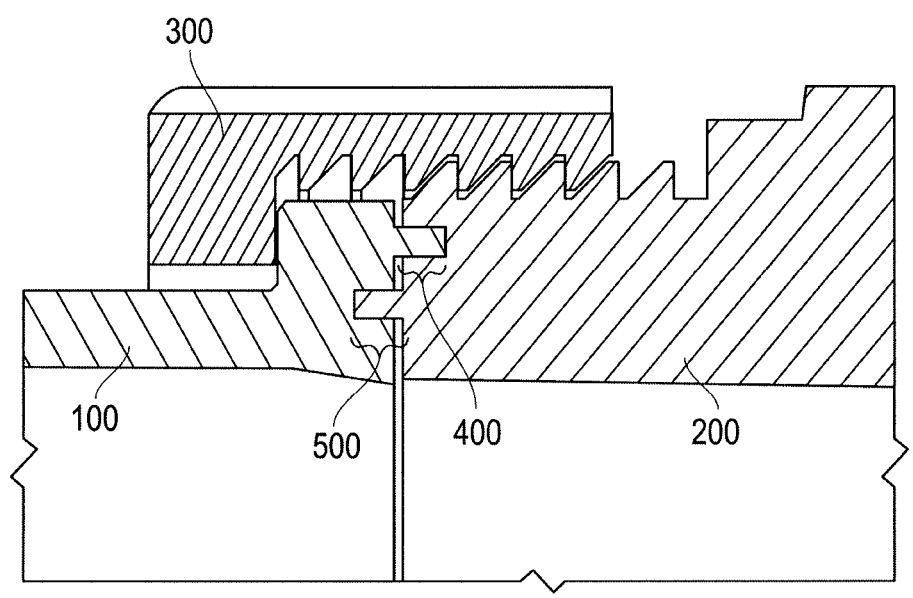
FIG. 3 includes an illustration of a portion of the fluid transport assembly of FIG. 2.

Referring to FIG. 3, the engagement can be a multifaceted engagement including a first sealing mechanism 400 and a second sealing mechanism 500 in addition to the threaded engagement between the second component and the nut 300. The multifaceted engagement can better maintain the fluid tight relationship between the different components of the assembly.

Figure 4:
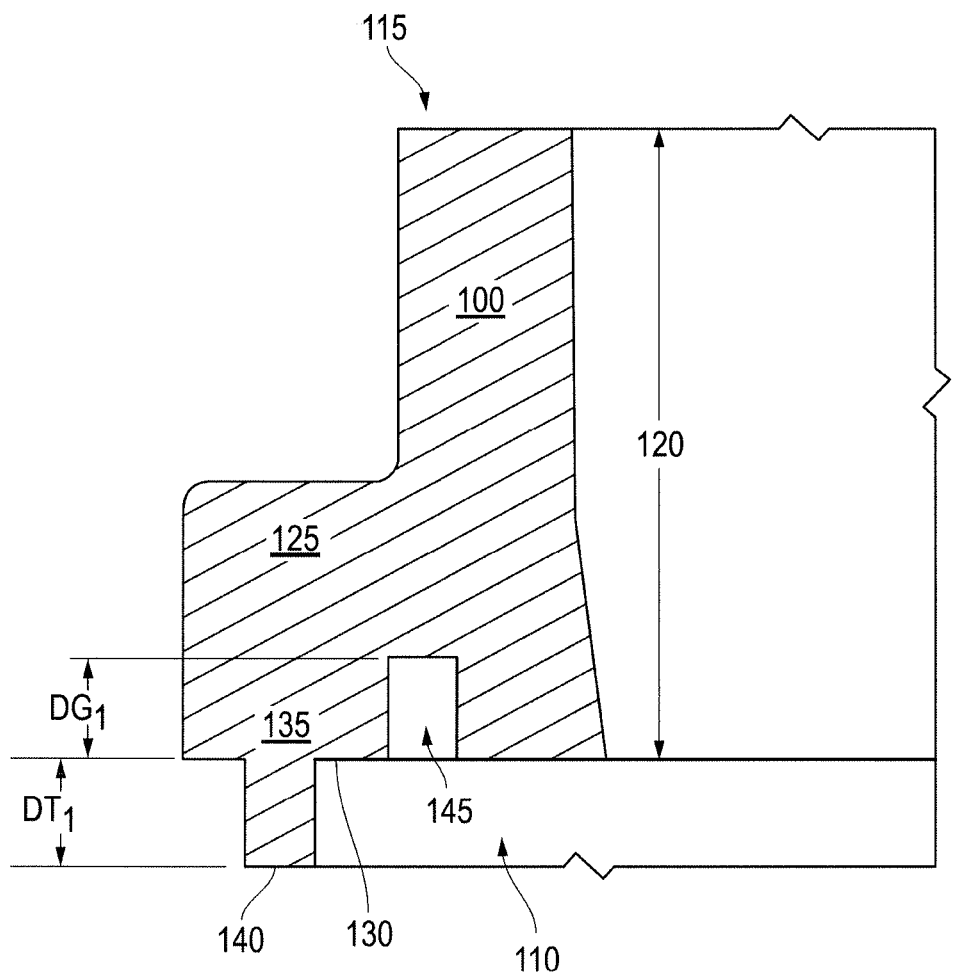
FIG. 4 includes an illustration of a first component according to an embodiment described herein.

Referring to FIG. 4, the first component 100 can include a body having a first axial end 110 and a second axial end 115 with a sidewall extending between the first axial end 110 and the second axial end 115. The sidewall can have an inner surface defining a hollow conduit 120 and an outer surface defining a thickness of the sidewall. The inner surface of the sidewall can be a smooth surface, such as a non-threaded surface. Similarly, the outer surface of the sidewall can be a smooth surface, such as a non-threaded surface. The terms "inner" and "outer," when referring to the features of the components of the assembly are in relation to the hollow conduit. In certain embodiments, the hollow conduit 120 can have an inner diameter of at least 0.5 cm, at least 1 cm, at least 1.5 cm, or even at least 2 cm. In further embodiments, the hollow conduit 120 may have an inner diameter of no greater than 11 cm, no greater than 9 cm, or no greater than 7 cm. Moreover, the hollow conduit 120 can have an inner diameter in a range of any of the above minimum and maximum values, such as 0.5 to 11 cm or 1 to 9 cm. The above values are not necessarily intended to limit the size of any part of the fluid transport. A person of ordinary skill in the art will recognize after reading this specification that the inner diameter can be less than or greater than the values listed above depending the application of the fluid assembly.

The first axial end 110 can be an end facing the second component that includes at least one tongue and at least one groove. For example, the first axial end can include a first flange 125 including a first axial face 130. The first flange can extend radially from an outer sidewall of the first component. In particular embodiments, the first flange can include the tongue. As illustrated in FIG. 4, a tongue 135 can extend axially from the first flange 125 and the first axial face 130 by a distance of $D_{T1}$, which is measured as the distance from the first axial face 130 to the furthest axial end 140 of the tongue 135. In certain embodiments, $D_{T1}$ can be at least 0.1 cm, at least 0.15 cm, at least 0.2 cm, or even at least 0.25 cm. In further embodiments, $D_{T1}$ may be no greater than 1 cm, no greater than 0.8 cm, no greater than 0.6 cm, or even no greater than 0.4 cm. Moreover, $D_{T1}$ can be in a range of any of the above minimum and maximum values, such as 0.1 to 1 cm or 0.15 to 0.8 cm. A person of ordinary skill in the art will recognize after reading this specification that $D_{T1}$ can be less than or greater than the values listed above depending the diameter of the fluid assembly and the thickness of the sidewalls. The tongue 135 can have a stepped configuration having an intermediate face disposed between the axial face 130 and the furthest axial end 140 of the tongue, so as to create an additional sealing face.

As discussed above, the axial end can include at least one tongue and at least one groove. As illustrated in FIG. 4, a groove 145 can be recessed into the first axial face 130 by a distance of $D_{G1}$, which is measured as the coaxial distance from the first axial face 130 to the furthest axial end 150 of the groove 145.

The groove can be disposed on either side of the tongue. For example, as illustrated in FIG. 4, the groove 145 is disposed between the tongue 135 and the inner sidewall. Further, a groove can be disposed between the tongue and the outer sidewall. In addition, in particular embodiments, the groove 145 can be offset from the intersection of the first axial face 130 and the tongue 135, so as to create an axially facing sealing surface between the tongue and the groove.

In certain embodiments, $D_{T1}$ can be the same or different than $D_{G1}$. For example, in certain embodiments, $D_{T1}$ can be greater than $D_{G1}$. It may be advantageous to have $D_{T1}$ be greater than $D_{G1}$ so as to form tight seal when in an assembled configuration. In other embodiments, $D_{T1}$ can be less than $D_{G1}$. In particular embodiments, the fluid transport assembly can have a tongue-groove ratio of $D_{G1}$ to $D_{T1}$. For example, a tongue-groove ratio of $D_{G1}$ to $D_{T1}$ can be at least about 0.25, at least about 0.5, at least about 0.75, or even at least about 0.8. Furthermore, a tongue-groove ratio of $D_{G1}$ to $D_{T1}$ can be no greater than about 5, no greater than about 4, no greater than about 3, no greater than about 2, no greater than about 1.8, or even no greater than about 1.6. Moreover, a tongue-groove ratio of $D_{G1}$ to $D_{T1}$ can be in a range of any of the minimums and maximums provided above, such as in a range of from about 0.25 to about 5, from about 0.5 to about 4, from about 0.75 to about 3, or even from about 0.8 to about 2. The ratio can be adapted to ensure all mating surfaces are sealed tight such that there is no gap between the surfaces when the assembly is tightened with a given closure torque. In certain embodiments, the closure torque can be at least 40 lb/ft*in, at least 50 lb/ft*in, or at least 60 lb/ft*in. In further embodiments, the closure torque may be no greater than 100 lb/ft*in or even no greater than 90 lb/ft*in. Moreover, the closure torque may be in a range of any of the above minimum or maximum values, such as 40 to 100 ft/lb*in or 50 to 90 lb/ft*in.

Further, the tongue can have a width the same as or less than the width or the corresponding groove. In certain embodiments, the width of the tongue may be no greater than 100% of the width of the corresponding groove. In further embodiments, the width of the tongue can be at least 90%, at least 92%, at least 94%, at least 96%, or even at least 98% of the width of the corresponding groove.

The second component 200 can be in the form of a valve. For example, the second component can be a check valve, a wye, a tee, and the like. In other embodiments, the second component can take on the form of a tube, a coupling, or any other structure in which fluid communication between two components is desired.

Figure 5:
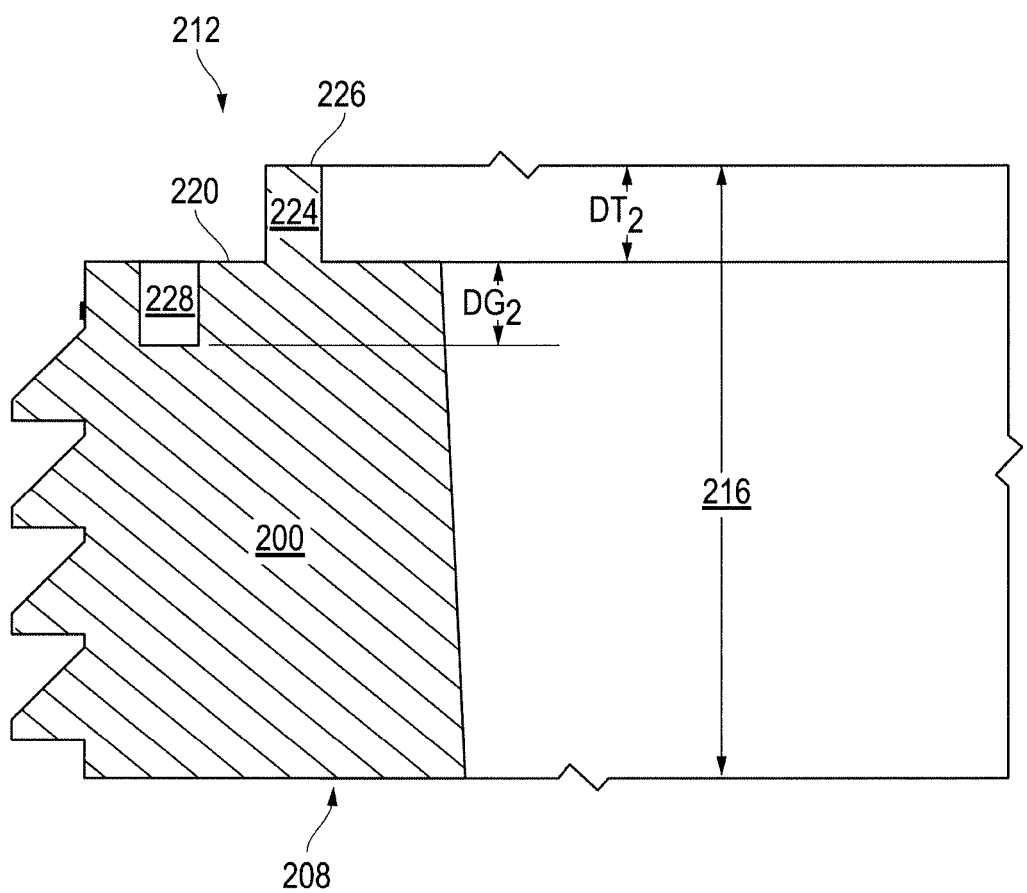
FIG. 5 includes an illustration of a second component according to an embodiment described herein.

Referring to FIG. 5, the second component 200 can include a body having a first axial end 208 and a second axial 212 end and a sidewall extending between the first and second axial ends 208, 212. Similar to the first component 100, the sidewall of the second component 200 can include an inner surface defining a hollow conduit 216 extending between the first axial end 208 and the second axial end 212.

Further, when fully assembled, the second component 200 can engage with the first component 100, as illustrated in FIGS. 1 and 2, such that the hollow conduit 120 of the first component 100 and the hollow conduit 216 of the second component 200 are in fluid communication. Furthermore, the transition between the inner surface of the first component 100 and the inner surface of the second component 200 can be essentially smooth. For example, when fully assembled, the fluid transport coupling can have a smooth inner bore.

Further, the sidewall of the second component can have an outer surface, the distance between the inner surface and the outer surface defining a thickness of the second component 200. In certain embodiments, the inner surface of the second component can be a smooth surface, such as a non-threaded. In further embodiments, the outer surface of the second component can include at least a smooth portion. In certain embodiments, the outer surface can include at least a threaded portion.

In certain embodiments, the second axial end 212 of the body of the second component 200 can be an end facing the first component 100 that includes at least one tongue and at least one groove. For example, the axial end 212 can include a second axial face 220. In particular embodiments, the second axial face 220 can be a generally planar face. A tongue 224 can extend axially from the second axial face 220 by a distance of $D_{T2}$, which is measured as the axial distance from the second axial face 220 to the furthest axial end 226 of the tongue 224. $D_{T1}$ and $D_{T2}$ can be the same or different. In certain embodiments, $D_{T1}$ and $D_{T2}$ are the same. In other embodiments, $D_{T1}$ and $D_{T2}$ are different. The tongue 224 can be set apart from the outer surface of the sidewall such that there is an axially-facing sealing face between the outer surface and the tongue 224.

Further, a groove 228 can be recessed coaxially into the second axial face 220 by a distance of $D_{G2}$, which is measured as the coaxial distance from the second axial face 220 to the furthest axial end 230 of the groove 228. In particular embodiments, the groove 228 can be offset from the second axial face 220. For example, there can be an axially-facing sealing face disposed between the tongue 224 and the groove 228. Further, in certain embodiments, $D_{T2}$ can be the same or different than $D_{G2}$. For example, in certain embodiments, $D_{T2}$ can be greater than $D_{G2}$. In other embodiments, $D_{T2}$ can be less than $D_{G2}$.

In particular embodiments, the second component can have a particular tongue-groove ratio of $D_{G2}$ to $D_{T2}$. For example, a tongue-groove ratio of $D_{G2}$ to $D_{T2}$ can be the same as or different than the ratio of $D_{G1}$ to $D_{T1}$. For example, the ratio $D_{G2}$ to $D_{T2}$ can be at least about 0.25, at least about 0.5, at least about 0.75, or even at least about 0.8. Furthermore, a tongue-groove ratio of $D_{G2}$ to $D_{T2}$ can be no greater than about 5, no greater than about 4, no greater than about 3, no greater than about 2, no greater than about 1.8, or even no greater than about 1.6. Moreover, a tongue-groove ratio of $D_{G2}$ to $D_{T2}$ can be in a range of any of the minimums and maximums provided above, such as in a range of from about 0.25 to about 5, from about 0.5 to about 4, from about 0.75 to about 3, or even from about 0.8 to about 2.

In certain embodiments, the first axial face of the first component can have a substantially complimentary profile to the second axial face of the second component. For example, as illustrated in FIGS. 1 and 2, the first axial face of the first component and second axial face of the second component can both be generally planar. In other embodiments, the first axial face of the first component and second axial face of the second component can have non-planar complimentary profiles. As illustrated in FIGS. 1 and 2, the first axial face of the first component has both a tongue and a groove, and the second axial face of the second component has both a tongue and a groove. The tongue of the first component is adapted to engage with the groove of the second component. Similarly, the groove of the first component is adapted to engage with the tongue of the second component. For example, the tongues and corresponding grooves can have complimentary profiles such that intimate contact of the tongue within the groove is obtained when engaged with the nut.

As further illustrated in FIGS. 1 and 2, the tongue and groove of the first component 100 and the second component 200 can each take on a generally rectangular profile. In other embodiments, the tongue and groove can take on a different shape, such as a polygon such as a square, a triangle, a "T" shape, a half-circle, or any other desired shape.

As further illustrated in FIGS. 1 and 2 the tongues and grooves can extend axially generally parallel in relation to the hollow conduits. Put a different way, the tongues and grooves can extend generally perpendicular to the first or second axial faces. In other embodiments, the tongues and grooves can extend at angle in relation to the hollow conduit and/or at an angle to the respective first or second axial faces.

As described above, the first component and the second component can be engaged through two sealing mechanisms, an outer sealing mechanism 400 an inner sealing mechanism 500. As illustrated in FIG. 3, the inner and outer sealing mechanisms 400, 500 include the complementary tongues and grooves of the first and second components. Accordingly, the outer sealing mechanism 500 is disposed radially further from the hollow conduit than the inner sealing mechanism 400.

In particular embodiments, such as illustrated in FIG. 3, the outer sealing mechanism 500 can include a tongue extending from the first component and a groove extending into the second component. The groove of the outer sealing mechanism can receive the tongue of the outer sealing mechanism. Further, the inner sealing mechanism 400 can include a tongue extending from the second component and a groove extending into the first component. The groove of the inner sealing mechanism can receive the tongue of the inner sealing mechanism. It will be understood that, in other embodiments (not illustrated), the outer sealing mechanism can include a tongue extending from the first component and a groove extending into the second component, and the inner sealing mechanism can include a tongue extending from the second component and a groove extending into the first component.

Figure 6:
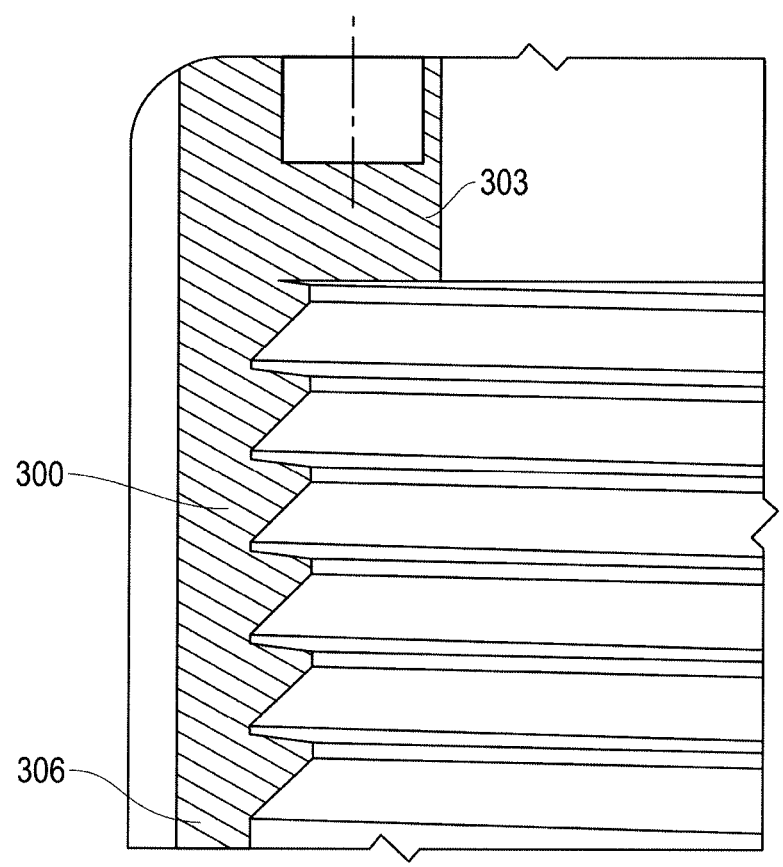
FIG. 6 includes an illustration of a nut according to an embodiment described herein.

As discussed above, the second component can include external threading. In certain embodiments, the external threading of the second component can be adapted to engage with the internal threading of the nut as will be described in more detail below. Referring again to FIGS. 1 and 2, in particular embodiments, the first component and second component can be held in engagement via a threaded and flanged nut 300. For example, as illustrated in FIG. 6, the nut 300 can include internal threading adapted to engage with external threading on the second component 200. Further, the threaded nut 300 can include a flange 303 which is adapted to contact with the flange of the first component. As the nut 300 is tightened, the first component 100 is urged towards the second component 200 to make a fluid tight connection of their hollow conduits.

It is to be understood that in particular embodiments, engagement of the first component 100 and the second component 200 can be accomplished by other structures than a threaded nut 300, such as, but not limited to, a clamp band, overmolding, tape, adhesive, and the like, and still be within the scope of particular embodiments of the present disclosure.

In certain embodiments, the second component 200 can further include a recess 230 adapted to receive a second flange 306 of the nut, as illustrated in FIG. 6. In certain embodiments, as illustrated in FIG. 2, the second flange 306 can extend axially beyond the internal threading of the nut. Similarly, the recess 230 can extend axially beyond the external threading of the second component 200. The second flange 306 of the nut can also have a profile adapted to fit within the recess 230.

A particular advantage of certain embodiments of the present disclosure is the unexpected discovery that the fluid transport couplings described herein can have a significantly improved working pressure and significantly improved longevity compared to state of the art fluid transport couplings.

To describe and quantify the working pressures, the fluid transport assemblies can be evaluated for leak detection while incrementally increasing the internal pressure of the fluid within the fluid transport coupling. The rated working pressure is defined as the maximum pressure obtainable before failure. As used herein, the working pressure is measured according to the Hydrostatic Hand Pump Test as is well understood in the art. The Hydrostatic hand Pump Test is performed with a rate of 2-3 psig increase per second at ambient conditions using water as the test fluid.

In particular embodiments, the fluid transport assembly can have a working pressure of at least about 100 PSI, at least about 150 PSI, at least about 200 PSI, at least about 225 PSI, at least bout 250 PSI, at least about 275 PSI, such as at least about 280 PSI, at least about 285 PSI, at least about 290 PSI, or even at least about 295 PSI, measured according to the Hydrostatic Hand Pump Test. In further embodiment, the fluid transport assembly can have a working pressure of no greater than about 1000 PSI, such as no greater than about 800 PSI, no greater than about 600 PSI, no greater than about 500 PSI, no greater than about 400 PSI, no greater than about 350 PSI, or even no greater than about 325 PSI, measured according to the Hydrostatic Hand Pump Test. Moreover, the fluid transport assembly can have a working pressure in a range of any of the minimums and maximums provided above, such as in a range of from about 100 PSI to about 1000 PSI, from about 150 PSI to about 600 PSI, from about 200 PSI to about 500 PSI, or even from about 275 PSI to about 400 PSI, measured according to the Hydrostatic Hand Pump Test.

In further embodiments, the fluid transport assembly can have a particularly improved longevity. To describe and quantify longevity, the fluid transport coupling can be assembled and cycled with a particular pressure with a defined on/off interval and periodically tested for leaks according to the Pressure Leak Snoop Test. As used herein, unless otherwise expressly stated, a cycle in the longevity test is performed with a 100 psig internal pressure and a 3 second on and a 3 second off interval with no back pressure.

Accordingly, in particular embodiments, the fluid transport assembly can maintain an essentially leakproof coupling after at least 100,000 cycles, such as at least about 120,000 cycles, at least about 130,000 cycles, at least about 140,000 cycles, at least about 150,000 cycles, at least about 160,000 cycles, at least about 170,000 cycles, at least about 180,000 cycles, at least about 190,000 cycles, or even at least about 200,000 cycles, measured according to the Pressure Leak Snoop Test. In further embodiments, the fluid transport assembly can maintain an essentially leakproof coupling up to 2 million cycles, up to 1 million cycles, up to 500,000 cycles, up to 400,000 cycles, up to 300,000 cycles, or even up to 250,000 cycles, according to the Pressure Leak Snoop Test. Moreover, the fluid transport assembly can maintain an essentially leakproof coupling within a range of cycles of any of the minimums and maximums provided above, such as in a range of from about 100,000 cycles to 2 million cycles, according to the Pressure Leak Snoop Test.

The present disclosure represents a departure from the state of the art. For example, particular embodiments described above have been unexepectedly discovered to exhibit significant improvements in the working pressure without leaks. Furthermore, particular embodiments described above have been unexpectedly discovered to exhibit significant improvements in longevity without needing to adjust the engagement mechanism, such as re-torquing the nut.

The invention will be further described with reference to the following non-limiting Examples. It will be apparent to those skilled in the art that many changes can be made in the embodiments described without departing from the scope of the present invention. Thus the scope of the present invention should not be limited to the embodiments described in this application, but only by embodiments described by the language of the claims and the equivalents of those embodiments. Unless otherwise indicated, all percentages are by weight.

EXAMPLES

A sample fluid transport coupling was made according to an embodiment described herein, as illustrated in FIG. 1. Each tongue and groove of the sample fluid transport coupling had a width of about 0.17 to 1.18 cm, with a $D_{T1}$ and $D_{T2}$ each of about 0.3, a $D_{G1}$ and $D_{G2}$ of about 0.25 cm, and a distance between tongue and groove of about 0.2 cm. Further, the first component and the second component, when assembled, define a hollow conduit having an inner diameter of about 6.5 cm.

Hydrostatic Hand Pump Test

To describe and quantify the working pressures, the sample was evaluated for leak detection while incrementally increasing the fluid pressure. The Hydrostatic Hand Pump Test as is well understood in the art. In this example, the Hydrostatic Hand Pump Test was performed using a conventional hand pump. Fluid pressure was incrementally increased at a ramp rate of about 2 to 3 psig per second at ambient conditions using water as the test fluid. No leaks were observed up to 297 psig.

Cycle & Snoop Test

The sample was also test for its longevity in maintaining an essentially leakproof coupling between components. In this example, the sample was connected to a conventional fluid pumping device which can cycle a defined pressurized fluid with a defined on/off interval. The sample was cycled at a 100 psig internal pressure and a 3 second on and a 3 second off interval with no back pressure. The sample was periodically tested for leaks according to the Pressure Leak Snoop Test, a well known and understood test for leaks. After completion of 185,940 cycles, no leaks were detected.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A fluid transport coupling subcomponent comprising: a body having a first axial end with a first axial face, a second axial end, and a hollow conduit extending between the first and second axial ends, a tongue extending longitudinally from the first axial face; and a groove recessed into the first axial face, wherein the tongue extends a distance, $D_{T1}$, from the first axial face, wherein the groove extends a distance, $D_{G1}$, into the body from the planar face, and wherein $D_{G1}$ is different than $D_{T1}$.

Embodiment 2

A fluid transport assembly comprising: a first component comprising a body having a first axial end with a first axial face, a second axial end, and a hollow conduit extending between the first and second axial ends, a tongue extending longitudinally from the first axial face; and a groove recessed into the first axial face, wherein the tongue extends a distance, $D_{T1}$, from the first axial face, wherein the groove extends a distance, $D_{G1}$, into the body from the first axial face, wherein $D_{G1}$ is different than $D_{T1}$, and a second component comprising: a body having a first axial end, a second axial end with a second axial face, and a hollow conduit extending between the first and second axial ends, a tongue extending longitudinally from the second axial face; and a groove recessed into the second axial face, wherein the tongue extends a distance, $D_{T2}$, from the second axial face, wherein the groove extends a distance, $D_{G2}$, into the body from the second axial face, and wherein $D_{G2}$ is different than $D_{T2}$, wherein the tongue of the first component is adapted to engage with the groove of the second component and wherein the tongue of the second component is adapted to engage with the groove of the first component such that the hollow conduit of the first component is in fluid communication with the hollow conduit of the second component.

Embodiment 3

A fluid transport coupling subcomponent comprising: a first component comprising: a body having a hollow conduit and an axial end and an axial face; a tongue extending from the axial face; a groove recessed into the axial face; and threading disposed on an outer surface of the body, wherein the threading is adapted to engage with a nut.

Embodiment 4

A fluid transport assembly comprising: a first component comprising: a body having a hollow conduit and an axial end and an axial face; a tongue extending from the axial face; a groove recessed into the axial face; and threading disposed on an outer surface of the body; a second component comprising: a body having a hollow conduit and an axial end and an axial face; a tongue extending from the axial face; and a groove recessed into the axial face; a flange extending radially from the body a nut adapted to engage with the treading of the first component and the flange of the second component such that as the nut is tightened, the first component is engaged with the second component; wherein the tongue of the first component is adapted to engage with the groove of the second component and wherein the tongue of the second component is adapted to engage with the groove of the first component.

Embodiment 5

A fluid transport assembly comprising: a first component comprising: a body having a first axial end with a first axial face, a second axial end, and a hollow conduit extending between the first and second axial ends; a tongue extending from the first axial face; and a groove recessed into the first axial face and circumscribing the hollow conduit, wherein the tongue extends a distance, $D_{T1}$, from the first axial face, wherein the groove extends a distance, $D_{G1}$, into the body from the first axial face, wherein $D_{G1}$ is different than $D_{T1}$, and wherein the tongue and groove are radially spaced apart from one another by a portion of the planar face; a second component comprising: a body having a first axial end, a second axial end with a second axial face, and a hollow conduit extending between the first and second axial ends; a tongue extending from the second axial face; and a groove recessed into the second axial face, wherein the tongue extends a distance, $D_{T2}$, from the second axial face, wherein the groove extends a distance, $D_{G2}$, into the body from the second axial face, and wherein $D_{G2}$ is different than $D_{T2}$; and a nut comprising a hub and a flange, the nut adapted to threadably engage the first and second components together such that the tongue of the first component couples with the groove of the second component and the tongue of the second component couples with the groove of the first component, wherein, in an engaged position, a line extending parallel with a central axis of the fluid transport assembly intersects the flange of the nut, the tongue of the first component, and the groove of the second component.

Embodiment 6

A tongue and grooved fluid transport coupling comprising a first component releasably engaged to and in fluid communication with a second component, wherein the fluid transport coupling has an essentially leakproof coupling between the first component and the second component at a working pressure of at least about 275 PSI as measured according to the Hydrostatic Hand Pump Test with a pressure ramp rate of 2-3 psig per second to failure at ambient conditions; and/or wherein the fluid transport assembly maintains an essentially leakproof coupling between the first component and the second component after at least 100,000 cycles as measured with a 100 psig inlet pressure with a 3 second on and a 3 second off interval and no back pressure, wherein the maintenance of the leakproof coupling is measured according to the Pressure Leak Snoop Test.

Embodiment 7

The fluid transport subcomponent or fluid transport assembly of any one of the preceding embodiments, wherein DG1 is greater than DT1.

Embodiment 8

The fluid transport subcomponent or fluid transport assembly of any one of the preceding embodiments, wherein DG1 is less than DT1.

Embodiment 9

The fluid transport subcomponent or fluid transport assembly of any one of the preceding embodiments, wherein a ratio of DG1 to DT1 is at least about 0.25, at least about 0.5, at least about 0.75, or even at least about 0.8.

Embodiment 10

The fluid transport subcomponent or fluid transport assembly of any one of the preceding embodiments, wherein a ratio of DG1 to DT1 is no greater than about 5, no greater than about 4, no greater than about 3, no greater than about 2, no greater than about 1.8, or even no greater than about 1.6.

Embodiment 11

The fluid transport subcomponent or fluid transport assembly of any one of the preceding embodiments, wherein a ratio of DG1 to DT1 is in a range of from about 0.25 to about 5, from about 0.5 to about 4, from about 0.75 to about 3, or even from about 0.8 to about 2.

Embodiment 12

The transport assembly of any one of the preceding embodiments, wherein DG2 is greater than DT2.

Embodiment 13

The fluid transport assembly of any one of the preceding embodiments, wherein DG2 is less than DT2.

Embodiment 14

The fluid transport subcomponent or fluid transport assembly of any one of the preceding embodiments, wherein a ratio of DG2 to DT2 is at least about 0.25, at least about 0.5, at least about 0.75, or even at least about 0.8.

Embodiment 15

The fluid transport subcomponent or fluid transport assembly of any one of the preceding embodiments, wherein a ratio of DG2 to DT2 is no greater than about 5, no greater than about 4, no greater than about 3, no greater than about 2, no greater than about 1.8, or even no greater than about 1.6.

Embodiment 16

The fluid transport subcomponent or fluid transport assembly of any one of the preceding embodiments, wherein a ratio of DG2 to DT2 is in a range of from about 0.25 to about 5, from about 0.5 to about 4, from about 0.75 to about 3, or even from about 0.8 to about 2.

Embodiment 17

The fluid transport subcomponent or fluid transport assembly of any one of the preceding embodiments, wherein a ratio of DG1 to DT1 is in a range of from about 0.25 to about 5, from about 0.5 to about 4, from about 0.75 to about 3, or even from about 0.8 to about 2; and wherein a ratio of DG2 to DT2 is in a range of from about 0.25 to about 5, from about 0.5 to about 4, from about 0.75 to about 3, or even from about 0.8 to about 2.

Embodiment 18

The fluid transport assembly of any one of the preceding embodiments, wherein DG1 is greater than DT1 and wherein DG2 is greater than DT2.

Embodiment 19

The fluid transport assembly of any one of the preceding embodiments, wherein DG1 is less than DT1 and wherein DG2 is less than DT2.

Embodiment 20

The fluid transport assembly of any one of the preceding embodiments, wherein the tongue of the first component and the groove of the second component have complimentary profiles.

Embodiment 21

The fluid transport assembly of any one of the preceding embodiments, wherein the groove of the first component and the tongue of the second component have complimentary profiles.

Embodiment 22

The fluid transport assembly of any one of the preceding embodiments, wherein the tongue of the first component and the groove of the second component have complimentary profiles and wherein the groove of the first component and the tongue of the second component have complimentary profiles.

Embodiment 23

The fluid transport subcomponent or fluid transport assembly of any one of the preceding embodiments, wherein the body of the first component comprises a flexible polymer tube.

Embodiment 24

The fluid transport subcomponent or fluid transport assembly of any one of the preceding embodiments, wherein the body of the first component comprises a valve.

Embodiment 25

The fluid transport subcomponent or fluid transport assembly of any one of the preceding embodiments, wherein the body of the first component comprises a check valve.

Embodiment 26

The fluid transport subcomponent or fluid transport assembly of any one of the preceding embodiments, wherein the body of the second component comprises a flexible polymer tube.

Embodiment 27

The fluid transport subcomponent or fluid transport assembly of any one of the preceding embodiments, wherein the body of the second component comprises a valve.

Embodiment 28

The fluid transport subcomponent or fluid transport assembly of any one of the preceding embodiments, wherein the body of the second component comprises a check valve.

Embodiment 29

The fluid transport subcomponent or fluid transport assembly of any one of the preceding embodiments, wherein the body of the first component comprises a flexible polymer tube; and wherein the body of the second component comprises a valve.

Embodiment 30

The fluid transport subcomponent or fluid transport assembly of any one of the preceding embodiments, wherein the body of the first component comprises a flexible polymer tube; and wherein the body of the second component comprises a flexible polymer tube.

Embodiment 31

The fluid transport subcomponent or fluid transport assembly of any one of the preceding embodiments, wherein the tongue and groove of the first component are monolithic with the body.

Embodiment 32

The fluid transport assembly of any one of the preceding embodiments, wherein the tongue and groove of the second component are monolithic with the second body.

Embodiment 33

The fluid transport assembly of any one of the preceding embodiments, wherein the tongue and groove of the first component are monolithic with the first body; and wherein the tongue and groove of the second component are monolithic with the second body.

Embodiment 34

The fluid transport subcomponent or fluid transport assembly of any one of the preceding embodiments, wherein the body of the first component comprises threading disposed on an outer surface of the body.

Embodiment 35

The fluid transport subcomponent or fluid transport assembly of any one of the preceding embodiments, wherein the body of the first component comprises threading disposed on an outer surface of the body, and wherein the body of the second component comprises threading disposed on an outer surface of the second body.

Embodiment 36

The fluid transport assembly of any one of the preceding embodiments, wherein the body of the first component comprises threading disposed on an outer surface of the body, wherein the body of the second component comprises a flange extending radially from the body, and wherein the fluid transport assembly further comprises a nut comprising internal threading, wherein the internal threading on the nut is adapted to engage with the threading of the first component and the flange of the second component such that as the nut is tightened, the first component and the second component are urged towards each other to form a fluid tight coupling between the first component and the second component.

Embodiment 37

The fluid transport assembly of any one of the preceding embodiments, wherein the nut comprises a flange adapted to contact with a flange of the second component.

Embodiment 38

The fluid transport assembly of any one of the preceding embodiments, wherein the fluid transport assembly has a working pressure of at least about 100 PSI, at least about 150 PSI, at least about 200 PSI, at least about 225 PSI, at least bout 250 PSI, at least about 275 PSI, such as at least about 280 PSI, at least about 285 PSI, at least about 290 PSI, or even at least about 295 PSI as measured according to the Hydrostatic Hand Pump Test with a rate of 2-3 psig per second to failure at ambient conditions.

Embodiment 39

The fluid transport assembly of any one of the preceding embodiments, wherein the fluid transport assembly has a working pressure of no greater than about 1000 PSI, such as no greater than about 800 PSI, no greater than about 600 PSI, no greater than about 500 PSI, no greater than about 400 PSI, no greater than about 350 PSI, or even no greater than about 325 PSI as measured according to the Hydrostatic Hand Pump Test with a rate of 2-3 psig per second to failure at ambient conditions.

Embodiment 40

The fluid transport assembly of any one of the preceding embodiments, wherein the fluid transport assembly has a working pressure in a range of in a range of from about 100 PSI to about 1000 PSI, from about 150 PSI to about 600 PSI, from about 200 PSI to about 500 PSI, or even from about 275 PSI to about 400 PSI, as measured according to the Hydrostatic Hand Pump Test with a rate of 2-3 psig per second to failure at ambient conditions.

Embodiment 41

The fluid transport assembly of any one of the preceding embodiments, wherein the fluid transport assembly maintains an essentially leakproof coupling between the first component and the second component after at least 100,000 cycles, such as at least about 120,000 cycles, at least about 130,000 cycles, at least about 140,000 cycles, at least about 150,000 cycles, at least about 160,000 cycles, at least about 170,000 cycles, at least about 180,000 cycles, at least about 190,000 cycles, or even at least about 200,000 cycles of 100 psig inlet pressure with a 3 second on and a 3 second off interval with no back pressure, wherein the leakproof coupling is measured according to the Pressure Leak Snoop Test.

Embodiment 42

The fluid transport assembly of any one of the preceding embodiments, wherein the fluid transport assembly maintains an essentially leakproof coupling between the first component and the second component for up to 2 million cycles, up to 1 million cycles, up to 500,000 cycles, up to 400,000 cycles, up to 300,000 cycles, or even up to 250,000 cycles of 100 psig inlet pressure with a 3 second on and a 3 second off interval with no back pressure, wherein the leakproof coupling is measured according to the Pressure Leak Snoop Test.

Embodiment 43

The fluid transport assembly of any one of the preceding embodiments, wherein the fluid transport assembly maintains an essentially leakproof coupling between the first component and the second component in a range of from about 100,000 cycles to 2 million cycles of 100 psig inlet pressure with a 3 second on and a 3 second off interval with no back pressure, wherein the leakproof coupling is measured according to the Pressure Leak Snoop Test.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:

1. A fluid transport coupling subcomponent comprising:
a body having a first axial end with a first axial face, a second axial end, and a hollow conduit extending between the first and second axial ends,
a tongue extending longitudinally from the first axial face; and
a groove recessed into the first axial face,
wherein the tongue extends a distance, $D_{T1}$, from the first axial face,
wherein the groove extends a distance, $D_{G1}$, into the body from the first axial face, and
wherein $D_{G1}$ is different than $D_{T1}$, and wherein an outermost radial surface of the tongue and an innermost radial surface of the tongue are both positioned a radial distance from an outermost radial edge of the body and the innermost radial edge of the body at the first axial end, wherein the groove has a generally rectangular profile, wherein the first axial end is tapered relative to the second axial end, and wherein an innermost radial surface of the groove is positioned a radial distance from the innermost radial edge of the body at the first axial end.

2. A fluid transport assembly comprising:
a first component comprising
a body having a first axial end with a first axial face, a second axial end, and a hollow conduit extending between the first and second axial ends,
a tongue extending longitudinally from the first axial face; and
a groove recessed into the first axial face,
wherein the tongue extends a distance, $D_{T1}$, from the first axial face,
wherein the groove extends a distance, $D_{G1}$, into the body from the first axial face,
wherein $D_{G1}$ is different than $D_{T1}$, and wherein an outermost radial surface of the tongue and an innermost radial surface of the tongue are both positioned a radial distance from an outermost radial edge of the body and the innermost radial edge of the body at the first axial end; and
a second component comprising:
a body having a first axial end, a second axial end with a second axial face, and a hollow conduit extending between the first and second axial ends,
a tongue extending longitudinally from the second axial face; and
a groove recessed into the second axial face,
wherein the tongue extends a distance, $D_{T2}$, from the second axial face,
wherein the groove extends a distance, $D_{G2}$, into the body from the second axial face,
wherein $D_{G2}$ is different than $D_{T2}$,
wherein the tongue of the first component is adapted to engage with the groove of the second component, and
wherein the tongue of the second component is adapted to engage with the groove of the first component such that the hollow conduit of the first component is in fluid communication with the hollow conduit of the second component.

3. The fluid transport assembly of claim 2, the assembly further comprising a nut comprising a hub and a flange, the nut adapted to threadably engage the first and second components together such that the tongue of the first component couples with the groove of the second component and the tongue of the second component couples with the groove of the first component, wherein, in an engaged position, a line extending parallel with a central axis of the fluid transport assembly intersects the flange of the nut, the tongue of the first component, and the groove of the second component.

4. The fluid transport assembly of claim 3, wherein a ratio of $D_{G1}$ to $D_{T1}$ is at least 0.25.

5. The fluid transport assembly of claim 3, wherein a ratio of $D_{G1}$ to $D_{T1}$ is no greater than 5.

6. The fluid transport assembly of claim 3, wherein a ratio of $D_{G2}$ to $D_{T2}$ is at least 0.25.

7. The fluid transport assembly of claim 3, wherein a ratio of $D_{G2}$ to $D_{T2}$ is no greater than 5.

8. The fluid transport assembly of claim 3, wherein the tongue of the first component and the groove of the second component have complimentary profiles.

9. The fluid transport assembly of claim 3, wherein the groove of the first component and the tongue of the second component have complimentary profiles.

10. The fluid transport assembly of claim 3, wherein the body of the first component comprises a flexible polymer tube.

11. The fluid transport assembly of claim 3, wherein the body of the second component comprises a flexible polymer tube.

12. The fluid transport assembly of claim 3, wherein the tongue and groove of the first component are monolithic with the first body; and wherein the tongue and groove of the second component are monolithic with the second body.

13. The fluid transport assembly of claim 3, wherein the body of the first component comprises threading disposed on an outer surface of the body, and wherein the body of the second component comprises threading disposed on an outer surface of the second body.

14. The fluid transport assembly of claim 3, wherein the body of the first component comprises threading disposed on an outer surface of the body, wherein the body of the second component comprises a flange extending radially from the body, and wherein the fluid transport assembly further comprises a nut comprising internal threading, wherein the internal threading on the nut is adapted to engage with the threading of the first component and the flange of the second component such that as the nut is tightened, the first component and the second component are urged towards each other to form a fluid tight coupling between the first component and the second component.

15. The fluid transport assembly of claim 3, wherein the nut comprises a flange adapted to contact with a flange of the second component.

16. The fluid transport assembly of claim 3, wherein the fluid transport assembly maintains a leakproof coupling between the first component and the second component after at least 100,000 cycles of 100 psig inlet pressure with a 3 second on and a 3 second off interval with no back pressure.

17. The fluid transport assembly of claim 3, wherein the body of the second component is smooth on at least one of the outer or inner surface of the body.

18. A fluid transport assembly comprising:
a first component comprising:
   a body having a hollow conduit and an axial end and an axial face;
   a tongue extending from the axial face;
   a groove recessed into the axial face; and
   threading disposed on an outer surface of the body, and wherein an outermost radial surface of the tongue and an innermost radial surface of the tongue are both positioned a radial distance from an outermost radial edge of the body and the innermost radial edge of the body at the first axial end;
a second component comprising:
   a body having a hollow conduit and an axial end and an axial face;
   a tongue extending from the axial face; and
   a groove recessed into the axial face;
   a flange extending radially from the body; and
a nut adapted to engage with the threading of the first component and the flange of the second component such that as the nut is tightened, the first component is engaged with the second component;
wherein the tongue of the first component is adapted to engage with the groove of the second component and wherein the tongue of the second component is adapted to engage with the groove of the first component.

* * * * *

UNITED STATES PATENT AND TRADEMARK OFFICE
CERTIFICATE OF CORRECTION

Page 1 of 1

PATENT NO. : 10,774,960 B2
APPLICATION NO. : 15/497480
DATED : September 15, 2020
INVENTOR(S) : Hy B. Nguyen et al.

It is certified that error appears in the above-identified patent and that said Letters Patent is hereby corrected as shown below:

On the Title Page

Item (73) "Assignee", please delete "SAINT GOBAIN PERFORMANCE PLASTICS CORPORATION" and insert therefor --SAINT-GOBAIN PERFORMANCE PLASTICS CORPORATION--.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*